United States Patent [19] [11] Patent Number: 4,594,271
Scholten et al. [45] Date of Patent: Jun. 10, 1986

[54] PROCESS FOR COATING INORGANIC PARTICLES WITH CONDENSATING POLYMERS

[75] Inventors: Pieter C. Scholten, Waalre; Fred W. Snyder, Eindhoven, both of Netherlands; Howard Sorkin, Glen Ridge, N.J.

[73] Assignees: U.S. Philips Corporation; North American Philips Corporation, both of New York, N.Y.

[21] Appl. No.: 787,408

[22] Filed: Oct. 15, 1985

Related U.S. Application Data

[63] Continuation-in-part of Ser. No. 685,657, Dec. 24, 1984, abandoned.

[51] Int. Cl.[4] .............................................. B05D 7/00
[52] U.S. Cl. .................................. 427/221; 427/385.5; 524/783; 524/879
[58] Field of Search ........................... 427/221, 385.5; 524/783, 879

[56] References Cited

U.S. PATENT DOCUMENTS

| | | | |
|---|---|---|---|
| 3,884,871 | 5/1975 | Herman et al. | 427/221 |
| 3,969,547 | 7/1976 | Isawa et al. | 527/221 |
| 3,991,007 | 11/1976 | Perronin et al. | 427/221 |
| 4,102,846 | 7/1978 | Bentley et al. | 524/533 |

Primary Examiner—Lewis T. Jacobs
Attorney, Agent, or Firm—Norman N. Spain

[57] ABSTRACT

A first stable suspension of at least one solid monomer, capable of being polymerized to a condensation polymer when heated, is formed in a first organic liquid inert during polymerization and containing a minor amount of a dispersing agent stable during said polymerization. A second stable suspension of finely divided inorganic particles in a second organic liquid inert during said polymerization and miscible with said first organic liquid, is formed and contains a minor amount of a dispersing agent. The first suspension is then added to the second suspension while stirring and heating the second suspension to the polymerization temperature of the monomer.

14 Claims, No Drawings

PROCESS FOR COATING INORGANIC PARTICLES WITH CONDENSATING POLYMERS

BACKGROUND OF THE INVENTION

This application is a continuation-in-part of application Ser. No. 685,657, filed Dec. 24, 1984, now abandoned.

This invention relates to a process for the production of coatings of condensation polymers on inorganic particles.

Bentley et al, U.S. Pat. No. 4,102,846, teaches a process for providing coatings of polymeric materials on inorganic particles, for example titanium dioxide, in which a stable dispersion is prepared by mixing together with the inorganic particles, in an inert organic liquid, particles consisting of a monomer which is insoluble in the organic liquid.

Included in this dispersion is a dispersing agent that is soluble in the organic liquid and in which dispersing agent both the soluble part and the part that attaches to the particles are polymeric in character. This patent also teaches that the dispersion containing the ingredients is heated at the polymerization temperature to form thereby coatings of the polymer on the inorganic particles.

This patent further shows that the process as disclosed may be employed for the polymerization of various condensation and addition polymers such as polyesters, polycarbonates, polyamides and polyureas.

In Example 1, column 12 of this patent, a specific example illustrating the process of this patent, a mixture of an aliphatic hydrocarbon of a boiling range of 170° to 210° C., 11-aminoundecanoic acid and titanium dioxide of a particle size of 0.2 μm is ground together with a graft co-polymer dispersant solution.

According to this example, after the charge is ground together in a ball mill to produce a dispersion having a mean particle size of about 1μ, the resultant dispersion is heated under reflux to 170° C.–183° C. As a result a dispersion is obtained containing particles of titanium dioxide encapsulated with Nylon-11 polymer with some of the Nylon 11 polymer being unassociated with the titanium dioxide particles.

It has been found that the process of this patent has the following defects:

(a) there is a strong tendency of the coated particles (and of the pigment-free polymer particles) to aggregate. In fact, the main product of the process is a continuous mass of polymer and particles;

(b) of the polymer particles that are found in the resulting suspension a large proportion contains no pigment; and (c) it is not possible to obtain thick coatings of the condensation polymer on the inorganic particles; contrary to expectation it has been found that increasing the monomer to pigment ratio merely leads to an increase in the fraction of large aggregates and pigment-free polymer particles formed.

SUMMARY OF THE INVENTION

A principal object of this invention is to provide an improved process for the coating of inorganic particles with condensation polymers, in which the product consists mainly of polymer particles which particles contain one or a few pigment particles, and essentially no large aggregates and pigment-free particles. Another principal object of this invention is to provide a method of coating inorganic particles with condensation polymers in which the thickness of the coating can be adjusted through the quantity of monomer added.

According to the invention, applicants have found that these objects may be achieved by use of a novel process in which two separate stable suspensions are formed, one of these suspensions being that of a solid monomer, capable of being polymerized to a condensation polymer when heated, in an organic liquid, provided with a dispersing agent that is stable at the polymerization temperature in the presence of the monomer and of the by-product(s) of the polymerization, the other suspension being of finely divided inorganic particles in an organic liquid, this suspension also being provided with a dispersing agent that is stable under the conditions of the polymerization of the monomer. Further, according to this novel process the suspension of the solid monomer is added to the suspension of the inorganic particles, while the latter suspension is heated to the polymerization temperature of the monomer, this addition being carried out at a rate such that the solubility limit of the monomer in the heated suspension of the inorganic particles is never exceeded.

Quite unexpectedly, it has been found that by employing the process of the invention it is possible to obtain a product that consists mainly of separately encapsulated inorganic particles and only minor quantities of pigment-free particles and aggregated material. Additionally, with this process it was found possible to control the thickness of the polymeric coating on the inorganic particles.

While satisfactory results are obtained with the use of various dispersing agents, it has been found that particularly good results are achieved when the dispersing agent consists of a long chain polybutene or polyisobutylene to which anchor and linking groups have been attached and in which dispersing agent carbon-to-carbon double bonds may be halogenated.

The process of the invention is useful for providing polymeric coatings on various inorganic particles such as filler materials, conductive materials and pigments including those particularly adapted for modifying the electrical or magnetic properties of the final products such as polymer coated metal particles, barium titanates and similar materials. The process is particularly adapted for the preparation of polymer-coated inorganic pigments. Such pigments are particularly useful in the paint, textile and paper industries.

Another important use for such coated pigments is as the pigments in electrophoretic display devices, as they provide the possibility to match the density of the pigment to the density of the dispersing medium. An example of coated pigments particularly adapted for such use are the Nylon-11 encapsulated titanium dioxide particles.

DETAILED DESCRIPTION OF THE INVENTION

While it has been found that long chain polybutenes or polyisobutylenes to which anchor groups and linking groups are attached and in which carbon-to-carbon double bonds may be halogenated are highly useful dispersing agents in the instant process, it has been found that particularly good results are achieved when the dispersing agent is the reaction product of a polybutene of a molecular weight of 1000–10000 and maleic anhydride imidized at least in part by an aliphatic amine.

The halogenation of the double bonds tends to prevent high temperature degradation of the dispersing agent.

Examples of suitable amines are ethylenediamine, diethylene triamine and tetraethylene pentamine.

It has been found that a particularly useful example of the preferred class of dispersing agents is the crankcase oil dispersant Amoco 9250 sold by Amoco, Inc. This latter dispersing agent has been found to be particularly useful when the solid monomer is 11-aminoundecanoic acid.

While, as the liquid solvent, any organic liquid with sufficiently high boiling point that is inert to the monomer at the reaction conditions may be used, it has been found that best results are achieved with high boiling liquid aliphatic or aromatic hydrocarbons having a boiling point of at least 165° C., specific examples of which are Decalin, odorless kerosene with boiling point 175°–200° C., such as Shellsol T sold by the Shell Oil Co. and Isopar H sold by Exxon.

While the process of the invention may be used for the production of any polymer coated pigment particles such as that of the condensation and addition polymers such as polyesters, polyamides, polyurethanes, and polyureas it is particularly useful in the production of polyamide-coated pigment particles.

For a more complete understanding the invention will now be described with reference to the following specific example.

EXAMPLE I

The following suspensions were prepared by ball milling:

Suspension A, which contained per liter of suspension
   556 g-$TiO_2$ (Dupont R100, particle size 0.2 um)
   46 g-dispersant—Amoco 9250 (as sold, unpurified)

Suspension B, which contained per liter of suspension
   240 g-monomer (11-aminoundecanoic acid)
   40 g-dispersant—Amoco 9250

As the suspending medium liquid odorless mineral spirits with a boiling range of 175°–200° C. was employed in each case.

A 250 milliliter flask equipped with a Dean and Stark head plus a cooler, a stirrer and a nitrogen inlet was charged with:
   110 ml of odorless mineral spirits (b.p. 175°–200° C.),
   40 ml hexadecane
   1 ml dispersant (Amoco 9250)
   7.5 ml Suspension A The contents of the flask were then heated to 195° C. and to this boiling and refluxing suspension, 25 mls of Suspension B were added in the course of 40 minutes while the contents of the flask were continuously stirred.

After the last addition, the flask was rapidly cooled. It was found that the flask contained a stable suspension of Nylon-11 encapsulated titanium dioxide particles with a narrow size range.

While the present invention has been described with reference to particular embodiments thereof, it will be understood that numerous modifications can be made by those skilled in the art without actually departing from the scope of the invention.

What we claim is:

1. A process for the production of coatings of condensation polymers on inorganic particles by polymerization of a monomer, capable of being polymerized to a condensation polymer in the presence of said inorganic particles, said process comprising:
   (a) forming a first stable suspension of at least one solid monomer, capable of being polymerized to a condensation polymer when heated, in a first organic liquid inert during said polymerization and containing a minor amount of a dispersing agent stable during said polymerization,
   (b) forming a second stable suspension of finely divided inorganic particles in a second organic liquid inert during said polymerization, miscible with said first organic liquid, and containing a minor amount of a dispersing agent stable during said polymerization and
   (c) adding said first suspension to said second suspension while stirring and heating said second suspension to the polymerization temperature of said monomer and while keeping the rate of addition of said first suspension to said second suspension so low that the solubility of said monomer in said heated second suspension is not exceeded.

2. The process of claim 1 wherein the inorganic particles are pigment particles.

3. The process of claim 2 wherein the pigment particles are titanium dioxide particles.

4. The process of claim 2 wherein the dispersing agent is a long chain polybutene or polyisobutylene having anchor and linking groups attached thereto.

5. The process of claim 3 wherein the dispersing agent is a long chain polybutene or polyisobutylene having anchor and linking groups attached thereto.

6. The process of claim 4 wherein both of said organic liquids are liquid hydrocarbons.

7. The process of claim 5 wherein both of said organic liquids are liquid hydrocarbons.

8. The process of claim 6 wherein the solid monomers are capable of forming polyamides by condensation polymerization.

9. The process of claim 7 wherein the solid monomers are capable of forming polyamides by condensation polymerization.

10. The process of claim 8 wherein the monomer is 11-aminoundecanoic acid.

11. The process of claim 9 wherein the monomer is 11-aminoundecanoic acid.

12. The process of claim 11 wherein the dispersing agent is the reaction product of a polybutene of a molecular weight of 1000–10000 with maleic anhydride imidized with an polyalkylene amine.

13. The process of claim 2 wherein the dispersing agent is a long chain polybutene or polyisobutylene having anchor and linking groups attached thereto and in which carbon-to-carbon double bonds are halogenated.

14. The process of claim 3 wherein the dispersing agent is a long chain polybutene or polyisobutylene having anchor and linking groups attached thereto and in which carbon-to-carbon double bonds are halogenated.

* * * * *

UNITED STATES PATENT AND TRADEMARK OFFICE
CERTIFICATE OF CORRECTION

PATENT NO. : 4,594,271

DATED : June 10, 1986

INVENTOR(S) : PIETER C. SCHOLTEN ET AL

It is certified that error appears in the above-identified patent and that said Letters Patent is hereby corrected as shown below:

IN THE TITLE:

change "CONDENSATING" to --CONDENSATION--.

Signed and Sealed this

Thirtieth Day of December, 1986

Attest:

DONALD J. QUIGG

Attesting Officer          Commissioner of Patents and Trademarks